United States Patent [19]

Gaind et al.

[11] 4,005,344
[45] Jan. 25, 1977

[54] PROTECTION CIRCUIT FOR BATTERY POWERED ELECTRONIC DEVICES

[75] Inventors: Jagjit R. Gaind, Forest Park; Philip J. Nowaczyk, Chicago, both of Ill.

[73] Assignee: Zenith Radio Corporation, Chicago, Ill.

[22] Filed: June 23, 1975

[21] Appl. No.: 589,639

[52] U.S. Cl. .............................. 317/31; 317/9 B; 320/13; 307/10 BP
[51] Int. Cl.² .................................. H02H 3/24
[58] Field of Search ............... 317/31, 9 B, 36 TD, 317/DIG. 5, 151, 141 S; 320/13, 29, 31, 33, 37, 39, 40; 340/249, 248 B; 307/10 BP

[56] References Cited
UNITED STATES PATENTS

| 3,244,899 | 4/1966 | Merle | 307/10 BP |
| 3,409,802 | 11/1968 | Savage | 320/33 X |
| 3,521,142 | 7/1970 | Ludlam | 320/39 |
| 3,623,131 | 11/1971 | Russell | 317/31 X |
| 3,646,354 | 2/1972 | Von Brimer | 320/40 X |
| 3,648,145 | 3/1972 | Meyer et al. | 320/13 |
| 3,723,752 | 3/1973 | Overholt et al. | 307/10 BP |

Primary Examiner—J D Miller
Assistant Examiner—Patrick R. Salce
Attorney, Agent, or Firm—Roy A. Ekstrand

[57] ABSTRACT

A rechargeable battery provides a source of operating potential for an electronic circuit load. An operator controlled on-off switch connects the battery to a relay, and through the normally open relay contacts, to the electronic circuit. The relay winding is returned to ground through a capacitor. When the switch is closed the relay is momentarily energized by the current which charges the capacitor. A transistor has its collector-emitter path in parallel with the capacitor and its base coupled to the movable tap on a voltage divider connected across the load. In the absence of a low voltage condition across the load, the transistor conducts maintaining relay closure for normal circuit operation.

2 Claims, 1 Drawing Figure

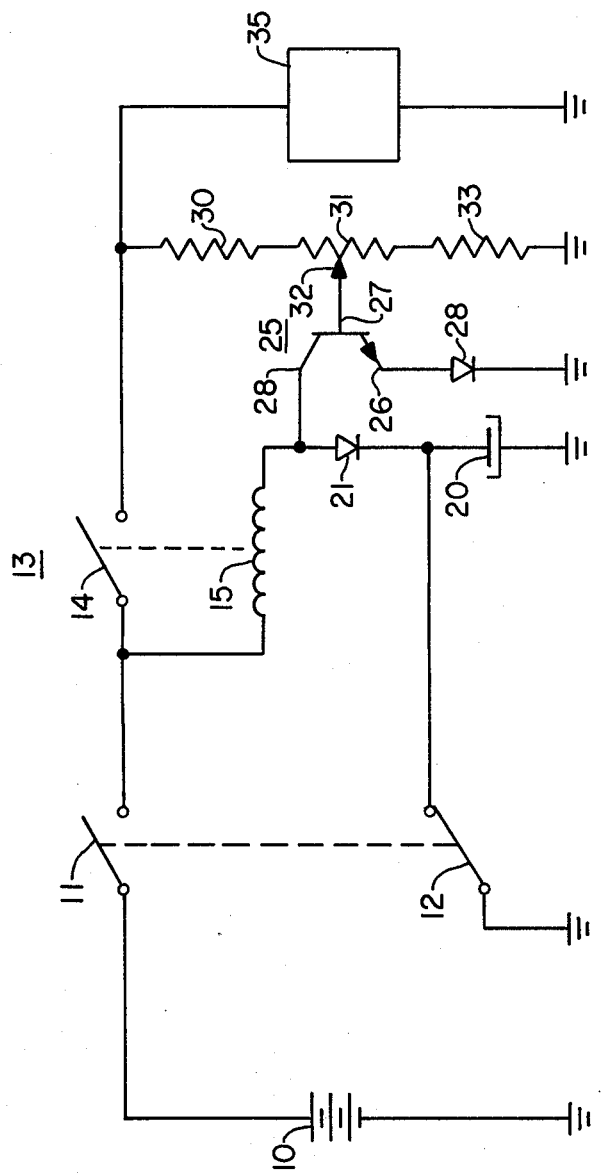

PROTECTION CIRCUIT FOR BATTERY POWERED ELECTRONIC DEVICES

BACKGROUND OF THE INVENTION

This invention relates to battery operated electronic circuits and in particular to those utilizing a rechargeable battery.

The use of batteries as sources of operating voltage in communication equipment, in particular in those devices in which it is desirable to have a high degree of mobility, has become widespread. In addition, consumer electronics products such as television and radio receivers are also available in battery-powered form. Generally radio receivers utilize disposable batteries while television receivers employ rechargeable types. Typically, television receivers include circuitry enabling the user to recharge the batteries during periods of non-use in preparation for subsequent use.

Of the many types of rechargeable batteries available, the most commonly used to operate higher power circuits (such as television receivers) is the lead-acid type which include a plurality of chemical compound bearing plates within an enclosed cavity. The cavity is filled with an electrolyte in either a liquid or "jell" form which serves as a reactant and charge carrier. During the charging process, a reversible chemical reaction stores energy in the battery in the form of a chemical imbalance. Energy is given up during battery discharge by a chemical reaction which essentially reverses the reaction occurring during charging. While these batteries provide a satisfactory power source for higher power circuitry, they are expensive and subject to several operational limitations, the most significant of which is susceptibility to damage due to excessive discharge. There exists in such batteries a minimum charge level discharge below which renders the battery unrechargeable and therefore useless. This creates considerable hazard to battery life since the battery will continue to supply power after the minimum charge level has been reached giving rise to the possibility of inadvertent battery damage.

The use of such power sources to supply a television receiver is further complicated by the varying current requirements thereof. Variations in the load presented by the signal processing and display forming circuitry of a television receiver can vary in excess of 20% due to operator control adjustments. This degree of current variation presents difficulties in the design and application of battery protective circuitry in such applications. Properly designed battery-operated television sets accommodate changes in operating voltage caused by normal battery discharge. Therefore, it is often the case that no receiver malfunction occurs during battery discharge which would serve as an indication to the viewer that the battery is being rendered unrechargeable by continued use.

The use of presently available fuses or thermally activated breakers interposed between the battery and the receiver circuitry will, under most conditions, provide protection from damage caused by high current drain. However, such devices are current responsive and cannot protect the battery discharging below its minimum charge level. In addition, because battery powered consumer electronic devices, for example, television receivers, are operated by persons having little knowledge of their operation, it is desirable to have a positive-response automatic protection circuit which the operator cannot override. However, the cost restrictions inherent in competitive consumer electronics markets makes the use of complex costly protection circuits unlikely.

OBJECTS OF THE INVENTION

It is an object of the present invention to provide an improved protection circuit for use with battery powered electronic equipment.

It is a further object of the present invention to provide a protection circuit responsive to excessive current drain and minimum charge level.

SUMMARY OF THE INVENTION

A protection circuit for use in combination with an electronic circuit having a battery source of operating voltage, susceptible to being damaged by excessive current drain or discharge below a predetermined level, includes a momentary coupling circuit which upon activation couples the battery to the electronic circuit for a brief interval. A sensing circuit senses the battery potential and overrides the momentary coupling circuit to maintain the coupling as long as the battery potential exceeds a predetermined level.

BRIEF DESCRIPTION OF THE DRAWING

The drawing shows a schematic diagram of a battery protection circuit constructed in accordance with the present invention.

DESCRIPTION OF THE PREFERRED EMBODIMENT

Referring to the drawing, a battery 10 has a positive electrode connected to one terminal of a switch 11 and a negative electrode connected to ground. The other terminal of switch 11 is connected to a relay 13. Relay 13 includes a normally open switch contact 14 operable in response to energization of a control winding 15. A first end of contact winding 15 is connected to one terminal of switch contact 14. The other terminal of switch contact 14 is connected to a load 35 which is understood to include the operating circuitry of a battery powered electronic device such as a television receiver. The second end of winding 15 is connected to a diode 21 which, in turn, is connected to one electrode of a grounded capacitor 20. The junction of diode 21 and capacitor 20 is connected to one terminal of a switch 12, the other terminal of which is connected to ground. Switches 11 and 12 are mechanically coupled for simultaneous operation as indicated by the interconnecting dashed line.

A resistive divider formed by the series combination of a resistor 30, a potentiometer 31 and resistor 33 is connected in parallel with load 35. A transistor 25 has an emitter electrode 26 connected to ground by a light-emitting diode 28, a base electrode 27 connected to a movable contact 32 on potentiometer 31 and a collector electrode 28 connected to the junction of winding 15 and diode 21. While the protection circuit of the connection may be used with a variety of specific apparatus, its preferred usage is in conjunction with a portable television receiver. In that form, the circuit is built into the receiver proper and switch 11 and switch 12 together form the receiver on-off switch. Load circuit 35 thus represents the operating circuitry of the receiver.

Operation is most readily understood by assuming that the receiver is off, that is, switch 11 is open. Switch 12 is, therefore, closed connecting the junction of diode 21 and capacitor 20 to ground, thus discharging capacitor 20.

The receiver is activated by the viewer operating switches 11 and 12 which simultaneously removes the short circuit from capacitor 20 and connects battery 10 to control winding 15. Current flow through winding 15 and diode 21 charges capacitor 20, at a rate determined by the size of capacitor 20 and the resistance of winding 15, and activates winding 15 of relay 13 to close switch contact 14. The coupling continues while capacitor 20 is charging and drawing sufficient current through winding 15 to keep relay 13 energized. As capacitor 20 approaches a charged condition and, absent other actions described below, relay 13 is de-energized opening contact 14. Thus, a momentary coupling occurs.

During this momentary coupling interval, battery power is supplied to the load and to the resistive divider. If the battery potential applied produces sufficient voltage at movable contact 32, transistor 25 is driven into conduction providing a second conductive path for the current through winding 15 to ground via the collector-to-emitter path of transistor 25 and diode 28. Under normal operation, this current continues and relay 13 remains energized to continue operation of the receiver.

Thus, the battery potential is detected during the momentary coupling interval and monitored thereafter during operation. This is of considerable importance due to the "surface charge" characteristic of batteries. Briefly, a discharged battery, upon standing idle for some time, may accumulate a surface charge which, if measured in the absence of loading, may give a false indication of battery condition. Because battery discharge below a predetermined level is one of the fault conditions of concern, the protection circuit of the invention is capable of decoupling the battery even though normal operation has begun.

Battery 10 has a relative low source impedance and, therefore, substantial current can be drawn from the battery with minor fluctuations in output voltage. However, should the current drain become excessive, as would result, for example, by load 35 being short circuited, the voltage drop across the battery source impedance would cause a significant reduction in battery potential. Potentiometer 31 permits adjustment of the voltage applied to base 27 of transistor 25. The potentiometer is adjusted such that variations in battery potential due to normal load variations are tolerated allowing transistor 25 to remain conductive. Thus the protection circuit, by monitoring the battery potential protects against load circuit faults and discharge below the minimum charge level for the battery.

Under a short circuit or prohibitively low impedance fault condition in load 35, the excessive current drain from battery 10, in combination with the internal source impedance of the battery, reduces the applied potential below the predetermined level. As a result, the voltage at base 27 is insufficient to sustain forward bias of transistor 25 causing it to become nonconductive. Current through control winding 15 ceases and relay 13 is de-energized, opening contact 14 and breaking the coupling between battery 10 and load 35. Similarly, if at any time the potential produced by battery 10 reaches the predetermined level because of its normal discharge, the potential applied to base 27 of transistor 25 falls below the predetermined voltage level and, in the manner described above, current through winding 15 ceases, de-energizing relay 13 and disconnecting battery 10 from load 35 thereby preventing damage to the battery.

It should be noted that when a fault condition occurs causing transistor 25 to turn off, capacitor 20, previously charged during the momentary coupling interval, remained charged due to the reverse action of diode 21. Therefore, no current flows through winding 15, diode 21 and capacitor 20 until capacitor 20 is discharged which can be effected by moving the on-off switch to its off position and reactivating the receiver by moving the switch to its on position. This very important "latch" feature insures that the receiver will not of itself return to operation without actuation of the on-off switch. In other words, once a fault condition occurs, the protection circuit latches in the decoupled mode.

It is also important to note that upon the occurrence of any fault condition, the operator cannot override the protection circuit for a period greater than the brief momentary coupling interval and thus inadvertently damage the battery. If a fault condition persists, reactivation of the on-off switch causes the momentary connection of battery 10 to load 35 during the charging of capacitor 20 described above. However, unless the fault condition is removed, transistor 25 will not conduct and once capacitor 20 is charged, relay 13 again opens the circuit.

As mentioned above, diode 28 is light-emitting, that is, when conducting it gives off light. Since the emitter current of transistor 25 causes this light emission, diode 28 serves to indicate "normal" battery coupling. If load 35 is a television receiver or similar communication device, a convenient indicator light is achieved by placing diode 28 in a location viewable by the operator.

What has been described is a battery protection circuit which initially couples the battery to the load circuitry for a brief interval during which the battery potential is determined and if correct, the coupling is maintained. Further, the described circuit monitors the battery potential and under fault conditions discontinues the coupling.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. For use in a television receiver utilizing a battery source of operating voltage, susceptible to being damaged by discharge below a predetermined potential, a protection circuit comprising:

a viewer operable on-off switch coupled to said battery;

a relay, having a normally open switch path in series with said on-off switch on said television receiver and a control winding having first and second ends, said first end coupled to said on-off switch;

a capacitor;

a diode coupling said capacitor to said second end of said control winding, said capacitor being charged through said control winding and said diode, when said on-off switch is moved to its on position, to momentarily energize said relay; and a transistor having a collector electrode coupled to said second end of said control winding, an emitter electrode coupled to ground, and a base electrode coupled to said television receiver, said transistor conducting to hold said relay energized if said battery potential exceeds said predetermined potential.

2. A protection circuit as set forth in claim 1, further including an adjustable resistor voltage divider substantially in parallel with said television receiver having a moveable contact coupled to said base electrode for adjusting the conduction threshold of said transistor.

* * * * *